No. 666,929. Patented Jan. 29, 1901.
R. B. FINCH.
EYEGLASSES.
(Application filed Oct. 18, 1900.)

(No Model.)

WITNESSES

INVENTOR.
Robert Brooks Finch
BY
ATTORNEY.

THE NORRIS PETERS CO., PHOTO-LITHO., WASHINGTON, D. C.

UNITED STATES PATENT OFFICE.

ROBERT BROOKS FINCH, OF DENVER, COLORADO, ASSIGNOR OF ONE-HALF TO EDWIN T. JONES, OF SAME PLACE.

EYEGLASSES.

SPECIFICATION forming part of Letters Patent No. 666,929, dated January 29, 1901.

Application filed October 18, 1900. Serial No. 33,529. (No model.)

*To all whom it may concern:*

Be it known that I, ROBERT BROOKS FINCH, a citizen of the United States of America, residing at Denver, in the county of Arapahoe and State of Colorado, have invented certain new and useful Improvements in Eyeglasses; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in eyeglasses; and it consists of the features hereinafter described and claimed, all of which will be fully understood by reference to the accompanying drawings, in which is illustrated an embodiment thereof.

Figure 1:
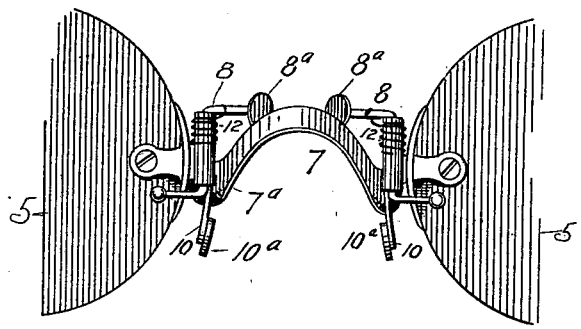
Figure 2:
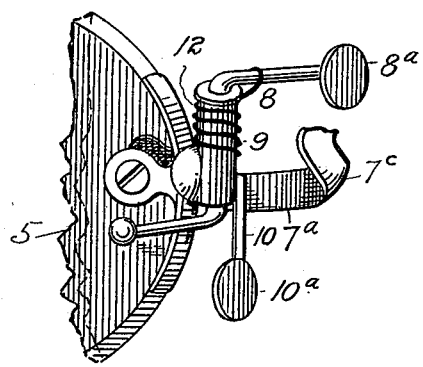
Figure 3:
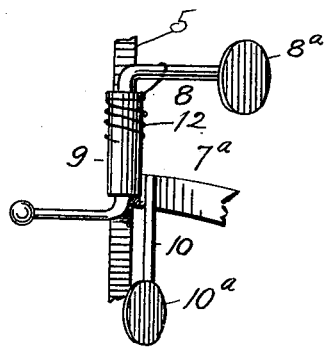

In the drawings, Figure 1 is an enlarged rear view of a pair of eyeglasses equipped with my improvements, the lenses being partly broken away. Fig. 2 is a fragmentary perspective view still further enlarged. Fig. 3 is a detail perspective view shown on a larger scale and viewed from a point between the lenses and at right angles to Fig. 1.

The same reference characters indicate the same parts in all the views.

Let the numeral 5 designate the lenses, 6 the mountings, 7 a saddle-bridge, and 8 the spring-held levers carrying the nosepieces $8^a$, said levers being journaled in sleeves 9, which are surrounded by springs 12. One extremity of each spring is connected with the lever-arm and the other extremity with the mounting or frame of the eyeglasses. The saddle-bridge is provided with a part $7^a$, projecting forwardly from a bend $7^c$, said bend being in a plane substantially perpendicular to the plane of the lenses.

My improvement consists in attaching an arm 10 to the frame or mounting 9 or to the extremity of the bridge part $7^a$, adjacent the mounting of each lens. This arm 10 projects downwardly from the bridge and terminates in a nosepiece $10^a$. Hence the nosepieces $10^a$ engage the nose below the projection $7^a$ of the bridge, while the nosepieces $8^a$ engage the nose above the projection $7^a$ of the bridge, the two nose-engaging parts forming, in effect, a divided nosepiece, one part of which is movable with the lever-arm and the other part being relatively stationary. The auxiliary arms 10 may be bent in or out or forward or backward at will, whereby they may be made to conform to the shape of any nose. These arms 10 when once adjusted are sufficiently rigid to maintain their position. The function of my present improvement is to supplement the action of these lever-arms 8, whereby the eyeglasses are held more securely in place and at the same time permit ready adjustment to fit the nose of any wearer. The position of the arms 10 is approximately in the plane of the lenses. As shown in the drawings, these arms occupy a position in a plane parallel with and slightly in the rear of the plane of the lenses. It must be understood, however, that I do not limit myself to the precise location shown, as it may be varied within reasonable limits.

Having thus described my invention, what I claim is—

1. In eyeglasses the combination with the frame or lens-mountings, a bridge, and spring-held lever-arms fulcrumed on the frame or mounting, of a nosepiece composed of two distinct parts, one of which is carried by the lever-arm and has a tendency to move toward the bridge, whereby there is coöperative gripping action between the bridge and nosepiece in a plane substantially perpendicular to the plane of the lenses, the other part being relatively stationary and extending downwardly from the bridge.

2. The combination with the eyeglass frame or mountings, and a bridge bent in a plane substantially perpendicular to the plane of the lenses, and having a part projecting forwardly from the bend to the lens-mounting or frame, and spring-held lever-arms fulcrumed on the frame or mounting and having nosepieces normally spring-pressed toward the bridge, whereby there is coöperative gripping action between the bridge and nosepieces in a plane substantially perpendicular to the plane of the lenses, the lever-arms projecting across the bridge; of relatively stationary arms extending downwardly from the bridge and provided with nosepieces arranged to coöperate with the nosepiece of the lever-arms.

3. In eyeglasses the combination with the frame or lens-mountings, a bridge, and lever-arms having nosepieces arranged to coöperate with the bridge in a plane substantially perpendicular to the plane of the lenses, of distinct, relatively stationary nosepieces extending downwardly from the bridge and acting in a plane substantially perpendicular to the plane of action of the lever-arm nosepieces.

In testimony whereof I affix my signature in presence of two witnesses.

ROBERT BROOKS FINCH.

Witnesses:
EDWIN T. JONES,
MARY C. LAMB.